United States Patent
Kalos et al.

(10) Patent No.: US 8,904,122 B2
(45) Date of Patent: *Dec. 2, 2014

(54) SELF-ADJUSTING SCSI STORAGE PORT QUEUE

(75) Inventors: Matthew J. Kalos, Tucson, AZ (US); Steven E. Klein, Tucson, AZ (US); Jens Wissenbach, Mainz (DE)

(73) Assignee: International Business Machines Corporation, Armonk, NY (US)

(*) Notice: Subject to any disclaimer, the term of this patent is extended or adjusted under 35 U.S.C. 154(b) by 101 days.

This patent is subject to a terminal disclaimer.

(21) Appl. No.: 13/449,444

(22) Filed: Apr. 18, 2012

(65) Prior Publication Data

US 2012/0203935 A1    Aug. 9, 2012

Related U.S. Application Data (63) Continuation of application No. 12/722,818, filed on Mar. 12, 2010.

(51) Int. Cl.
  *G06F 12/00*    (2006.01)
  *G06F 13/00*    (2006.01)

(52) U.S. Cl.
  CPC ................................ *G06F 13/00* (2013.01)
  USPC ............... 711/156; 710/5; 710/6; 711/112; 711/114

(58) Field of Classification Search
  None
  See application file for complete search history.

(56) References Cited

U.S. PATENT DOCUMENTS

| | | | |
|---|---|---|---|
| 5,426,736 A | 6/1995 | Guineau, III | |
| 5,978,355 A | 11/1999 | Yamaguchi | |
| 6,421,723 B1 | 7/2002 | Tawil | |
| 7,337,248 B1 | 2/2008 | Rao et al. | |
| 7,574,538 B1 | 8/2009 | Yochai | |
| 2003/0140195 A1* | 7/2003 | Borkenhagen et al. | 711/118 |
| 2005/0229182 A1 | 10/2005 | Grover et al. | |
| 2005/0240649 A1* | 10/2005 | Elkington et al. | 709/200 |
| 2006/0251090 A1 | 11/2006 | Jones | |
| 2007/0067505 A1 | 3/2007 | Kaniyur et al. | |
| 2008/0104283 A1* | 5/2008 | Shin et al. | 710/6 |
| 2009/0187705 A1 | 7/2009 | Bernardi et al. | |

OTHER PUBLICATIONS

Erickson, Shawn "Re: Best way to handle SCSI queue full" Jul. 21, 2004. Retrieved from: http://lists.apple.com/archives/ata-scsi-dev/2004/Jul/msg0057.html.*

(Continued)

*Primary Examiner* — Matthew Bradley
*Assistant Examiner* — Daniel Tsui
(74) *Attorney, Agent, or Firm* — Nelson and Nelson; Daniel P. Nelson; Alexis V. Nelson (57) ABSTRACT

A method for managing storage space in a storage port queue includes establishing a watermark for the storage port queue. The method further receives, at the storage port associated with the storage port queue, a command having an initiator-target-LUN (ITL) nexus associated therewith. Upon receiving the command, the method determines whether the used space in the storage port queue has reached the watermark. In the event the used space has not reached the watermark, the method processes the command. In the event the used space has reached the watermark and a specified number of commands for the ITL nexus are already present in the storage port queue, the method rejects the command. Otherwise, the method may process the command.

5 Claims, 7 Drawing Sheets

(56) References Cited

OTHER PUBLICATIONS

Donis, et al., "A Hill-climbing Approach to the Queue Depth Assignment Problem to Ensure Customer QoS Subscriptions," ISCC Proceedings of the Third IEEE Symposium on Computers & Communications, Jun. 30-Jul. 2, 1998, pp. 632-636, IEEE Computer Society, Washington, DC, USA.

Wang, et al., "An Effective-Traffic Based Dual-Threshold Queue Control Scheme in Shared Memory Switch," International Conference on Wireless Communications, Networking and Mobile Computing, Sep. 21-25, 2007, pp. 1933-1936, WiCom.

Cardone, et al., "Guaranteed Delivery of Event Notifications Across Wide Area Networks;" Jul. 1998, IP.com No. IPCOM000123243D.

\* cited by examiner

SELF-ADJUSTING SCSI STORAGE PORT QUEUE

BACKGROUND

1. Field of the Invention

This invention relates to host adapter storage ports, and more particularly to apparatus and methods for managing storage port queues in host adapter storage ports.

2. Background of the Invention

In SCSI-over-Fibre-Channel networks, host ports (acting as SCSI initiators) are typically configured with a SCSI queue depth setting. This setting establishes the total number of concurrent commands that a host port can send on each ITL nexus (ITL refers to the initiator-target-LUN tuple, which is the basis for most SCSI operations). Storage ports (acting as SCSI targets) may also be configured with a queue depth setting. This setting establishes the total number of concurrent operations that the storage port can receive and process from all host ports that it communicates with. Typical standard values for the queue depth setting may be 16 for the host port queue depth, and 2048 for the storage port queue depth. Therefore, using typical settings, a storage port could potentially support a maximum of 2048/16=128 logical volumes.

Given that some modern storage controllers support up to 64K volumes, these storage controllers would theoretically require 64K/128=512 storage ports, or 1024 storage ports with redundant links. However, these same modern storage controllers may only support a maximum of 128 ports. This means it is impossible to utilize all volumes supported by the storage controller without significantly oversubscribing the storage port queues.

Problems may arise on oversubscribed storage port queues if the port receives more commands than it can queue. This is usually not the case, since I/O workload is typically bursty by nature and it is improbable that enough volumes will be accessed concurrently to cause a problem. However, a queue overrun condition will occur in the rare event that the storage port receives more commands than it can queue. When this happens, there are several options to handle the queue overrun condition.

The first option is to do nothing. This can lead to lost commands, host transport errors, performance issues caused by timeouts on the host, and general system instability. A second option is to limit the host configuration in a way that prevents overrunning the storage port queue. This is not a viable option since it can make a storage controller uncompetitive, and some hosts may already have configurations that oversubscribe the storage port queues. A third option is to change the storage controller architecture (e.g., add ports, decrease the number of supported logical volumes, etc.). This may work for future hardware designs but may not be a solution for current storage controllers. It also has the potential drawbacks of option two. Furthermore, it may be impossible or prohibitively expensive using current technology to increase the number of physical ports on the storage controller.

A fourth option is to adjust the host's global queue depth setting. Setting this to one, for example, would allow 64K volumes to be accessed on the storage controller. This is not a viable option since dramatically lowering the host queue depth will significantly degrade system performance. Furthermore, some workloads require high I/O concurrency and this option would not support such workloads. A fifth option is to return SCSI QFULL or BUSY status to a host when the storage port queue is full. This is the general solution implemented in the storage industry today. This can inform the host that the storage port queue is full, thereby allowing the host to throttle back the workload. However, one drawback to this approach is that it may cause multiple hosts to compete for the same slot or slots in the queue. This may cause a similar result to option one. Another possible outcome of this option is that it will starve slower or unlucky hosts from completing work. That is, this option may cause a host's work to receive QFULL/BUSY status so many times that it may cause the host to lose access to the storage port.

In view of the foregoing, what is needed is a solution that will enable oversubscribing storage port queues while simultaneously reducing or eliminating storage port queue overruns and/or host workload starvation. Ideally, the solution will support high I/O concurrency for high demand host workloads.

SUMMARY

The invention has been developed in response to the present state of the art and, in particular, in response to the problems and needs in the art that have not yet been fully solved by currently available apparatus and methods. Accordingly, the invention has been developed to provide apparatus and methods for managing storage space in a storage port queue. The features and advantages of the invention will become more fully apparent from the following description and appended claims, or may be learned by practice of the invention as set forth hereinafter.

Consistent with the foregoing, a method for managing storage space in a storage port queue is disclosed herein. In certain embodiments, such a method includes establishing a watermark for a storage port queue associated with a storage port. The method further receives, at the storage port, a command having an initiator-target-LUN (ITL) nexus associated therewith. Upon receiving the command, the method determines whether the used space in the storage port queue has reached the watermark. In the event the used space has not reached the watermark, the method processes the command. In the event the used space has reached the watermark and a specified number of commands for the ITL nexus are already present in the storage port queue, the method rejects the command. Otherwise, the method may process the command. In this way, the method enables the oversubscription of the storage port queue while simultaneously reducing or eliminating overruns of the storage port queue and/or the starvation of slower or unlucky hosts from completing work.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
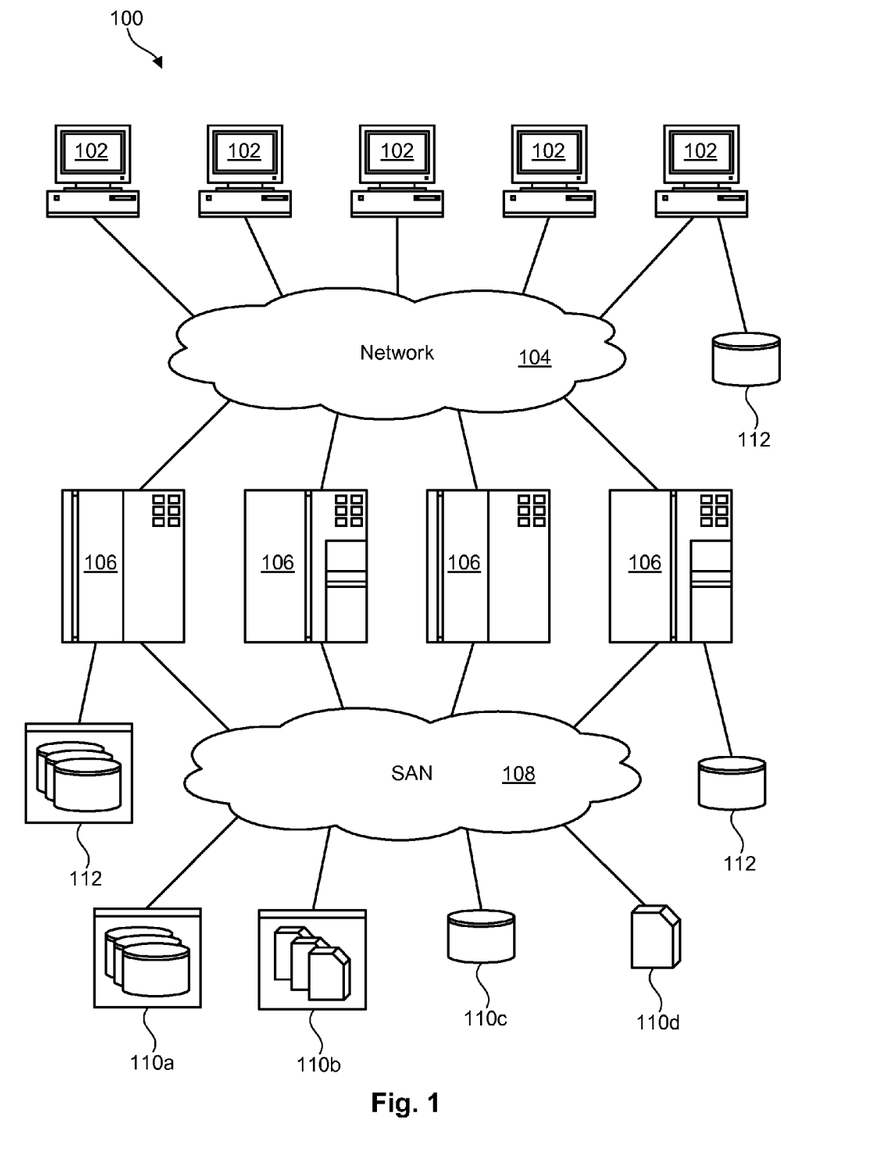
FIG. 1 is a high-level block diagram showing one example of a network environment where an apparatus and method in accordance with the invention may be implemented.

Referring to FIG. 1, one example of a network architecture 100 is illustrated. The network architecture 100 is presented to show one example of an environment where an apparatus and method in accordance with the invention may be implemented. The network architecture 100 is presented only by way of example and is not intended to be limiting. Indeed, the apparatus and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems 106"). In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., arrays of hard disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. Where the network 108 is a SAN, the servers 106 and storage systems 110 may communicate using a networking standard such as Fibre Channel (FC). One or more of the storage systems 110 may utilize the apparatus and methods disclosed herein to manage space in one or more storage port queues.

Figure 2:
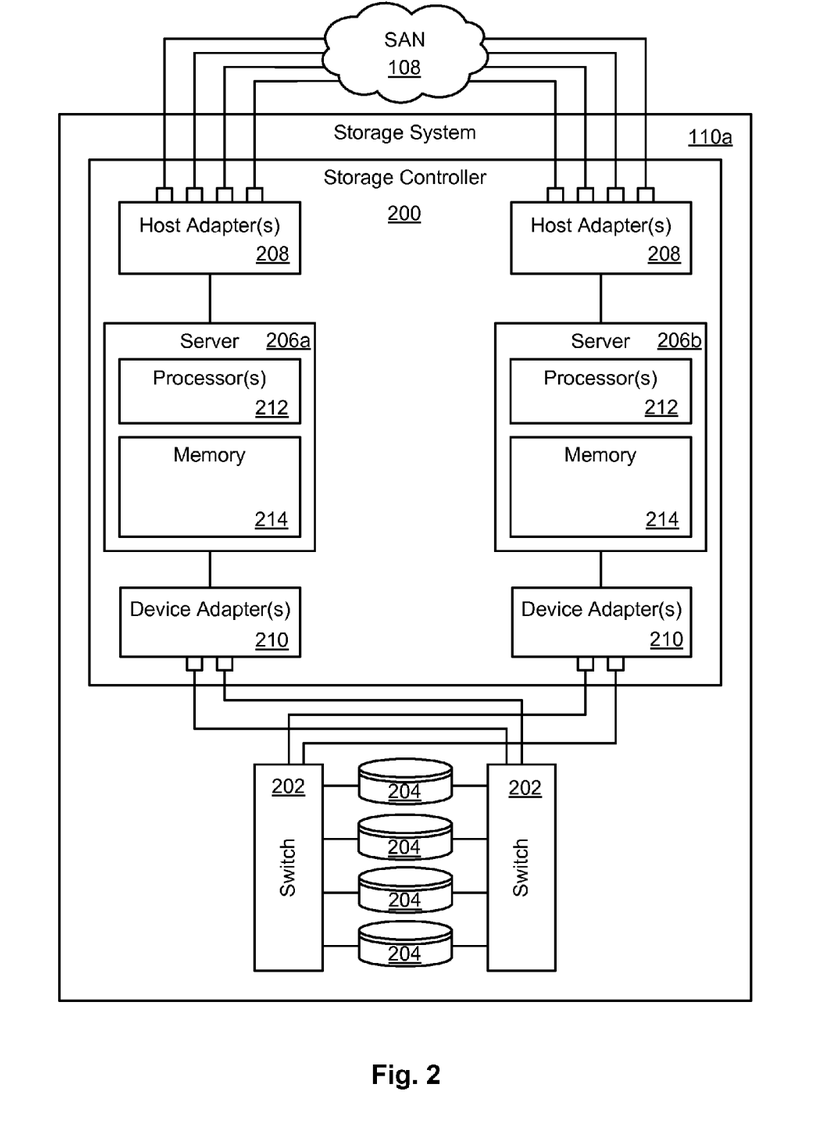
FIG. 2 is a high-level block diagram showing one example of a storage system where an apparatus and method in accordance with the invention may be implemented.

Referring to FIG. 2, one embodiment of a storage system 110a containing an array of storage devices 204 (e.g., hard-disk drives 204 and/or solid-state drives 204) is illustrated. The internal components of the storage system 110a are shown since the disclosed apparatus and methods may, in certain embodiments, be implemented within such a storage system 110a, although they are not limited to such a storage system 110a. As shown, the storage system 110a includes a storage controller 200, one or more switches 202, and one or more storage devices 204, such as hard-disk drives 204 or solid-state drives 204 (e.g., flash-memory-based drives 204). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host systems 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

One example of a storage system 110a having an architecture similar to that illustrated in FIG. 2 is the IBM DS8000™ series of enterprise storage systems. The DS8000™ is a high-performance, high-capacity storage controller providing disk storage that is designed to support continuous operations. The DS8000™ series models may use IBM's POWER5™ servers 206a, 206b, which may be integrated with IBM's virtualization engine technology. Nevertheless, the apparatus and methods disclosed herein are not limited to the IBM DS8000™ enterprise storage system 110a, but may be implemented in any comparable or analogous storage system 110, regardless of the manufacturer, product name, or components or component names associated with the storage system 110. Any storage system 110 that could benefit from one or more embodiments of the invention is deemed to fall within the scope of the invention. Thus, the IBM DS8000™ is presented only by way of example and is not intended to be limiting.

In selected embodiments, each server 206 includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

Figure 3:
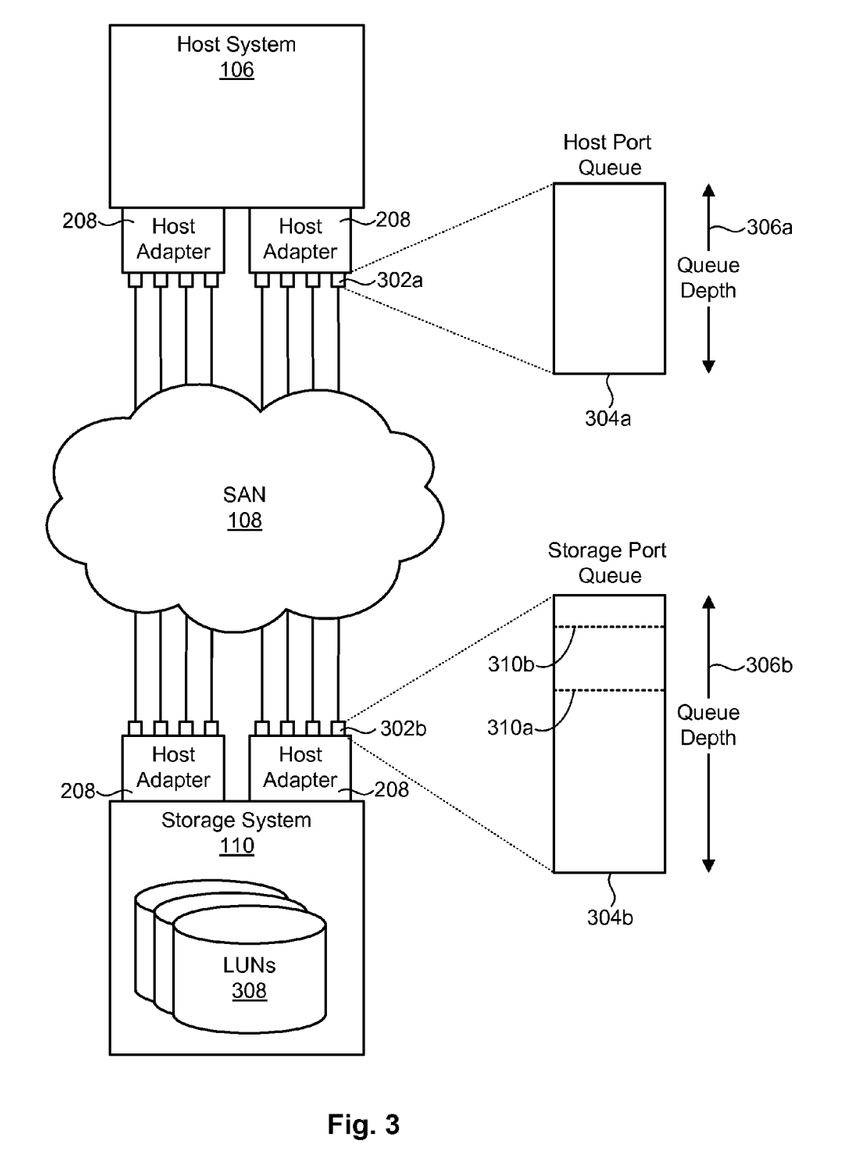
FIG. 3 is a high-level block diagram showing one embodiment of a storage port queue having a pair of watermarks established therein.

Referring to FIG. 3, each host system 106 and storage system 110 may include one or more host adapters 208 to communicate with other host systems 106 and storage systems 110 over a storage network 108. A storage network 108 may include connectivity provided by a switch, fabric, direct connection, or the like. In certain embodiments, the host adapters 208 are embodied as adapter cards plugged into expansions slots of the host system 106 and storage system 110, respectively, although this is not mandatory. The host adapters 208 include one or more ports 302. For the purposes of this disclosure, a port on a host system 106 is referred to as a "host port" 302a and a port on a storage system 110 is referred to as a "storage port" 302b.

Each host port 302a may include a host port queue 304a characterized by a host port queue depth 306a. The host port queue depth 306a establishes the total number of concurrent commands that a host port 302a can send on each ITL nexus. Similarly, each storage port 302b may include a storage port queue 304b characterized by a storage port queue depth 306b. The storage port queue depth 306b establishes the total number of concurrent operations that the storage port 302b can receive and process from all connected host ports 302a. As previously mentioned, typical standard values for the queue depth setting are 16 for the host port queue depth 306a, and 2048 for the storage port queue depth 306b. Therefore, using typical settings, a storage port 302b could potentially support a maximum of 2048/16=128 logical volumes (LUNs) 308 in the storage system 110.

In order to accommodate configurations where a storage port 302b is oversubscribed (i.e., is configured to provide access to more LUNs 308 than it can theoretically support), one or more watermarks 310 may be established in the storage port queue 304b. These watermarks 310 may be used to monitor the amount of used space in the storage port queue 304b. When the used space reaches one of these watermarks 310a, 310b, the host adapter 208 may modify the way it handles commands received from host systems 106 in order to more efficiently manage remaining space in the storage port queue 304b. The manner in which a storage port 302b manages space in its storage port queue 304b when the used space reaches one of the watermarks 310 will be discussed in association with FIGS. 4 and 6.

Figure 4:
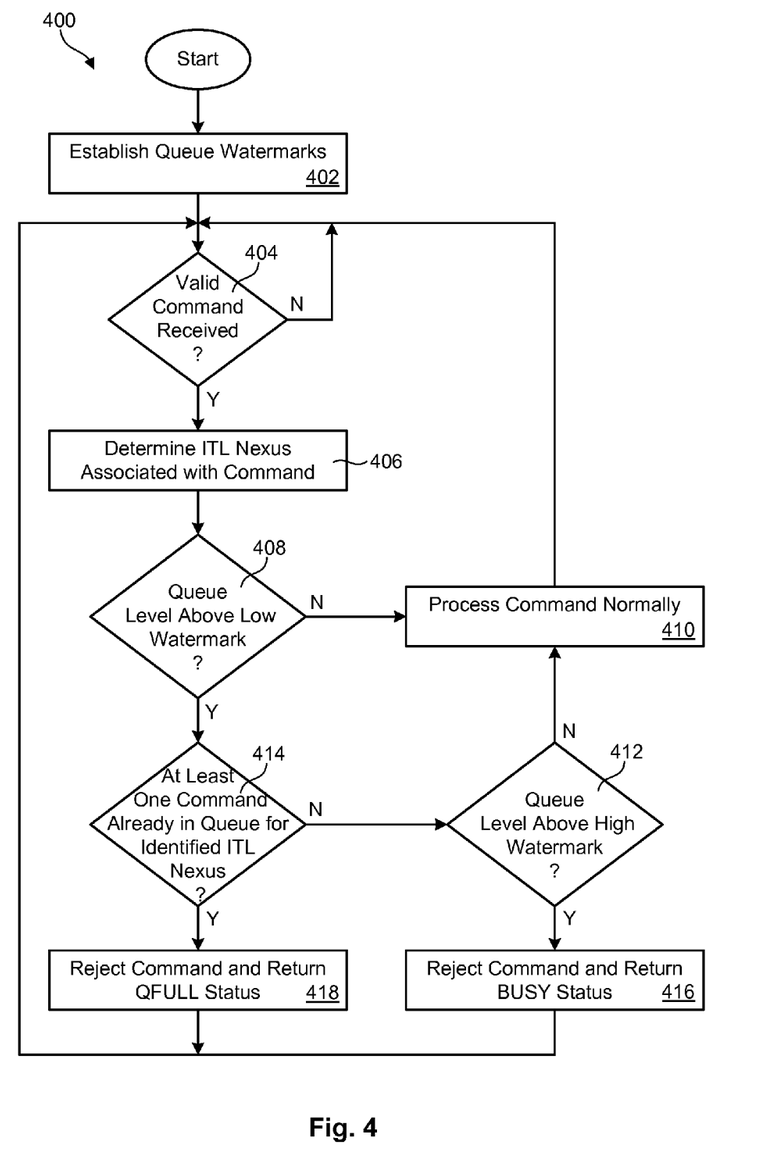
FIG. 4 is a flow diagram showing one embodiment of a method for managing space in the storage port queue illustrated in FIG. 3.

Referring to FIG. 4, one embodiment of a method 400 for managing space in a storage port queue 304b is illustrated. As shown, the method 400 initially establishes 402 one or more watermarks 310 in the storage port queue 304b. In this example, two watermarks 310a, 310b are established in the storage port queue 304b—a low watermark 310a and a high watermark 310b. For example, if the storage port queue 304b is configured to hold 2K commands (i.e., the storage port queue depth 306b is 2K), the low watermark 310a may be established at 1.5K and the high watermark 310b may be established at 1.9 K. Thus, the used space will reach the low watermark 310a when the storage port queue 304b is 1.5K full, and the used space will reach the high watermark 310b when the storage port queue 304b is 1.9K full. The location of the watermarks 310a, 310b is provided only by way of example and is not intended to be limiting.

The method 400 then determines 404 whether a valid (i.e., not illegal) command is received. In certain embodiments, the method 400 may ignore special commands such as error-recovery commands or high-priority commands, such as commands used to reset selected hardware or abort certain operations. These special commands may be sent to the front of the queue 304b and may be treated differently from conventional SCSI commands. Such special commands may affect commands that are already in the queue 304b and thus may be given special priority instead of being placed at the end of the queue 304b.

Once the method 400 determines 404 that a valid command has been received, the method 400 determine 406 the ITL nexus that is associated with the command. Regarding the ITL nexus, the storage controller 200 or an adaptor 208 in the storage controller 200 may maintain nexus information for each possible connection that includes a host port 302a, a storage port 302b, and a logical unit 308. Using SCSI terminology, an initiator (I) interacts with a target (T) to issue I/O operations to a logical unit (L). While the I/O operation is in progress, the initiator, target, and LUN have a relationship that may be referred to as an "ITL nexus."

Once the ITL nexus is determined 406 for the command, the method 400 determines 408 whether the used space in the storage port queue 304b has reached the low watermark 310a. If the used space has not reached the low watermark 310a, this means that the storage port queue 304b has plenty of free space available and is not close to an overrun. In such a case, the method 400 processes 410 the command normally and waits 404 for the next command. However, if the method 400 determines 408 that the used space in the storage port queue 304b is above the low watermark 310a, this means that the amount of free space in the storage port queue 304b has fallen below a desired threshold. In this case, the method 400 will modify the way it handles commands to more efficiently manage the remaining free space in the storage port queue 304b.

For example, if the amount of used space is above the low watermark 310a, the method 400 determines 414 whether there is at least one command already in the storage port queue 304b for the ITL nexus identified in step 406. If at least one command with the ITL nexus is already present in the storage port queue 304b, the method 400 rejects 418 the command (i.e., does not process the command) and returns 418 QFULL status to the host port 302a that initiated the command. This will tell the host port 302a that the storage port queue 304b was full and the storage port 302b was thus unable to process the command. This will allow the host system 106 to retry the command over the same path at a later time or redrive the command down an alternative path.

On the other hand, if the method 400 determines 414 that at least one other command for the ITL nexus is not present in the storage port queue 304b (and determines 412 that the amount of used space in the queue 304b is below the high watermark), the method 400 processes 410 the command normally (i.e., places the command in the queue 304b so it can be processed in due course) and waits 404 for the next command. This will ensure that slower or unlucky hosts 106 that have no commands currently pending in the storage port queue 304b will be able to complete work. On the other hand, hosts 106 that already have one or more commands pending in the storage port queue 304b will be prevented from adding more commands to the queue 304b until the amount of used space falls below the low watermark 310a. This will prevent faster or more active hosts 106 from dominating the remaining space in the queue 304b.

If the method 400 determines 412 that the amount of used space in the storage port queue 304b has reached the high watermark 310b, this means that the storage port queue 304b is almost full and is close to being overrun (assuming that the high watermark 310b is placed at or near the top of the queue 304b). In such a case, the method 400 rejects 416 the command and returns 416 BUSY status to the host port 302a that initiated the command. This will inform the host port 302a that the storage port 302b is busy and is thus unable to process the command. This will allow the host system 106 to retry the command over the same path at a later time, redrive the command down an alternative path, or perform some other suitable action. Thus, when the used space in the storage port queue 304b exceeds the high watermark 310b, all commands received by the storage port 302b will be rejected regardless of whether other commands for the same ITL nexus are in the storage port queue 304b.

Figure 5:
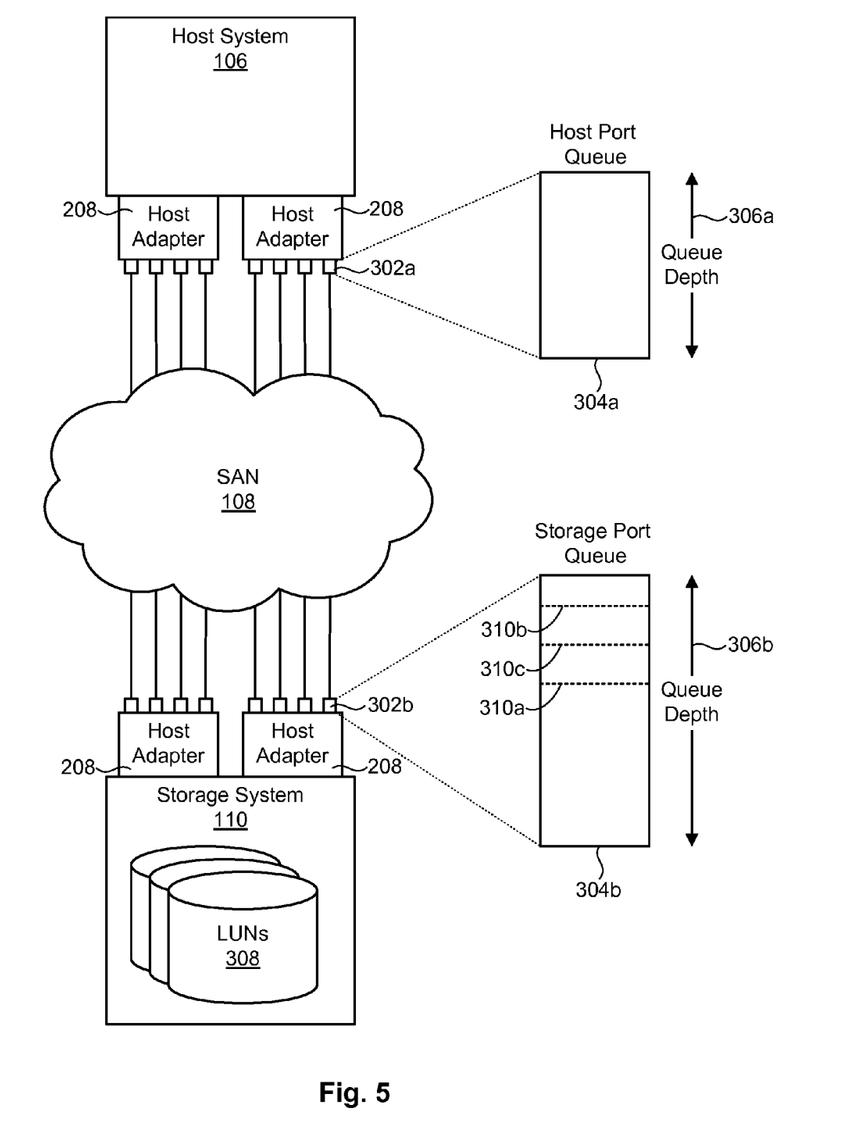
FIG. 5 is a high-level block diagram showing another embodiment of a storage port queue having watermarks established therein.

Referring to FIG. 5, in selected embodiments, additional watermarks 310c may be established in the storage port queue 304b. These additional watermarks 310c may be used to more gradually reduce the number of commands that are stored in the storage port queue 304b for each ITL nexus as the queue 304b fills with commands. This will allow the storage port queue depth for each ITL nexus to be reduced in a gradual manner as the queue 304b fills as opposed to the more abrupt reduction discussed in association with FIG. 4. For example, when the used space in the storage port queue 304b reaches the low watermark 310a, the storage port 302b may reject commands where at least X number (e.g., 10) of commands for the same ITL nexus are already in the storage port queue 304b. Similarly, when the used space in the storage port queue 304b reaches an intermediate watermark 310c, the storage port 302b may reject commands where at least Y number (e.g., 5) of commands for the same ITL nexus are already in the storage port queue 304b, where Y<X. When the used space in the storage port queue 304b reaches the high watermark 310b, the storage port 302b may reject commands regardless of how many other commands for the same ITL nexus are present in the storage port queue 304b.

Figure 6:
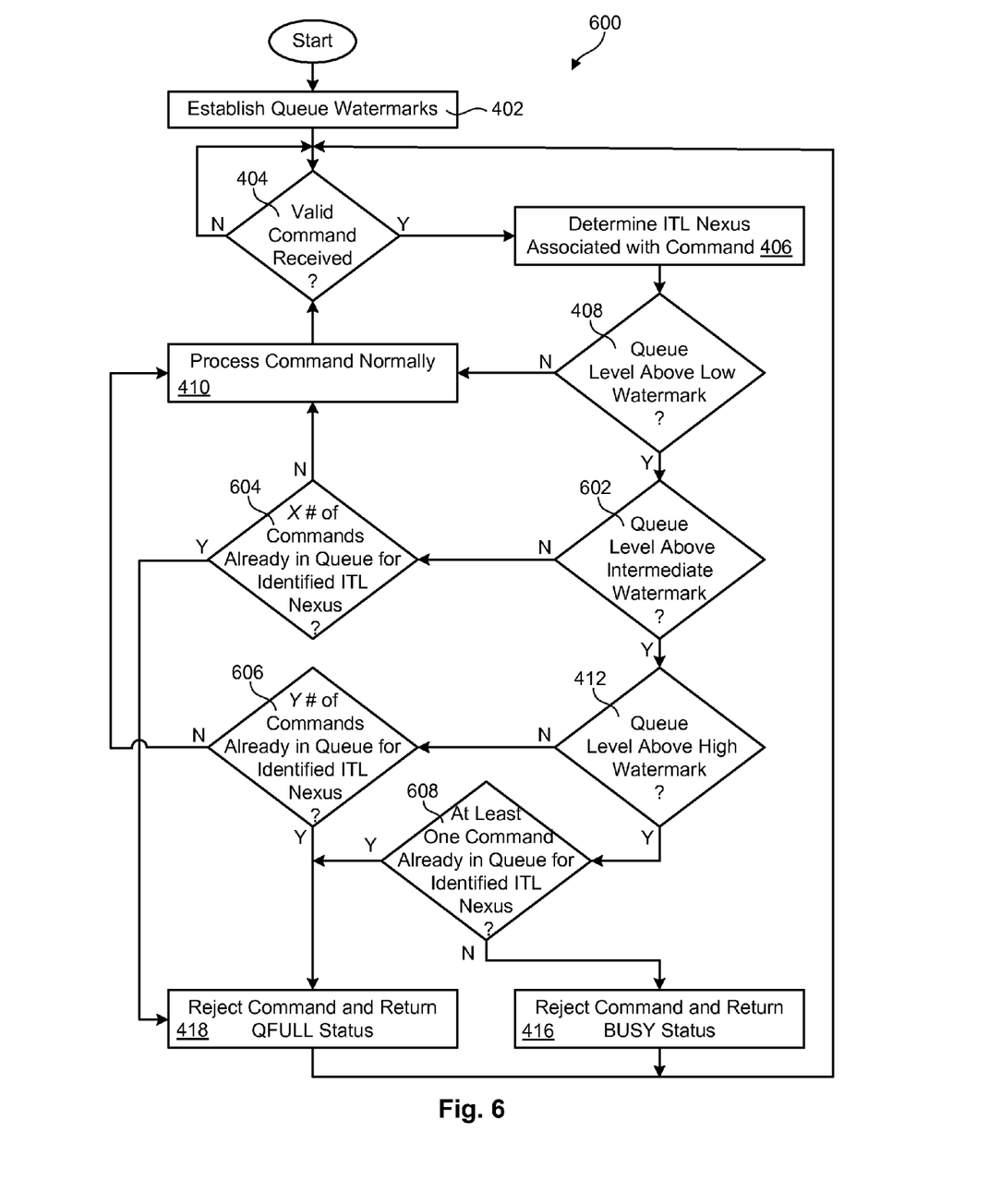
FIG. 6 is a flow diagram showing one embodiment of a method for managing space in the storage port queue illustrated in FIG. 5.

Referring to FIG. 6, one embodiment of a method 600 for managing space in a storage port queue 304b using a more gradual reduction of the storage port queue depth for each ITL nexus is illustrated. As shown, the method 600 initially establishes 402 watermarks 310 in the storage port queue 304b. In this example, three watermarks 310a, 310b, 310c are established—a low watermark 310a, an intermediate watermark 310c, and a high watermark 310b. The number and location of the watermarks 310a, 310b, 310c within the storage port queue 304b is a design choice that may be varied. Similarly, the number and location of the watermarks 310, as well as the number of commands that are allowed for each ITL nexus at each watermark 310, may be hard-coded into the adapter 208 or varied in response to user input.

Once the watermarks 310 are established 402, the method 600 waits 404 to receive a valid command. Once a valid command is received, the method 600 determines 406 the ITL nexus associated with the command. The method 600 then determines 408 whether the used space in the storage port queue 304b has reached the low watermark 310a. If the used space has not reached the low watermark 310a, the method 600 processes 410 the command in the conventional manner and waits 404 for the next command. However, if the used space in the storage port queue 304b is above the low watermark 310a (but below the intermediate watermark 310c), the method 600 determines 604 whether at least X (e.g., 10) commands are already in the storage port queue 304b for the ITL nexus identified in step 406. If at least X commands are already in the storage port queue 304b, the method 600 rejects 418 the command (i.e., does not process the command) and returns 418 QFULL status to the host port 302a that initiated the command. If, on the other hand, the method 600 determines 604 that less than X commands for the same ITL nexus are present in the storage port queue 304b, the method 600 processes 410 the command in the conventional manner and waits 404 for the next command.

If, upon receiving a valid command, the method 600 determines 602 that the used space in the storage port queue 304b is above the intermediate watermark 310c (but below the high watermark 310b), the method 600 determines 606 whether at least Y (e.g., 5) commands are already in the storage port queue 304b for the ITL nexus identified in step 406. If at least Y commands are present, the method 600 rejects 418 the command and returns 418 QFULL status to the host port 302a that initiated the command. If, on the other hand, the method 600 determines 606 that less than Y commands for the same ITL nexus are in the storage port queue 304b, the method 600 processes 410 the command and waits 404 for the next command.

If the method 600 determines 412 that the amount of used space in the storage port queue 304b has reached the high watermark 310b and determines 608 that there are no commands for the same ITL nexus in the storage port queue 304b, the method 600 rejects 416 the command and returns 416 BUSY status to the host port 302a that initiated the command. This will inform the host port 302a that the storage port 302b is busy and is thus unable to process the command. On the other hand, if the method 600 determines 412 that the amount of used space in the storage port queue 304b has reached the high watermark 310b and determines 608 that there is at least one command for the same ITL nexus in the storage port queue 304b, the method 600 rejects 418 the command and returns 418 QFULL status to the host port 302a that initiated the command. This will inform the host port 302a that the storage port queue 304b is full and is unable to process the command. In this way, the method 600 more gradually reduces the storage port queue depth for each ITL nexus to some number X, then to some smaller number Y, and then to zero, as the storage port queue 304b fills with commands. Any number of additional watermarks 310 may be established in the storage port queue 304b to provide additional discrete reductions at any desired level of granularity.

Figure 7:
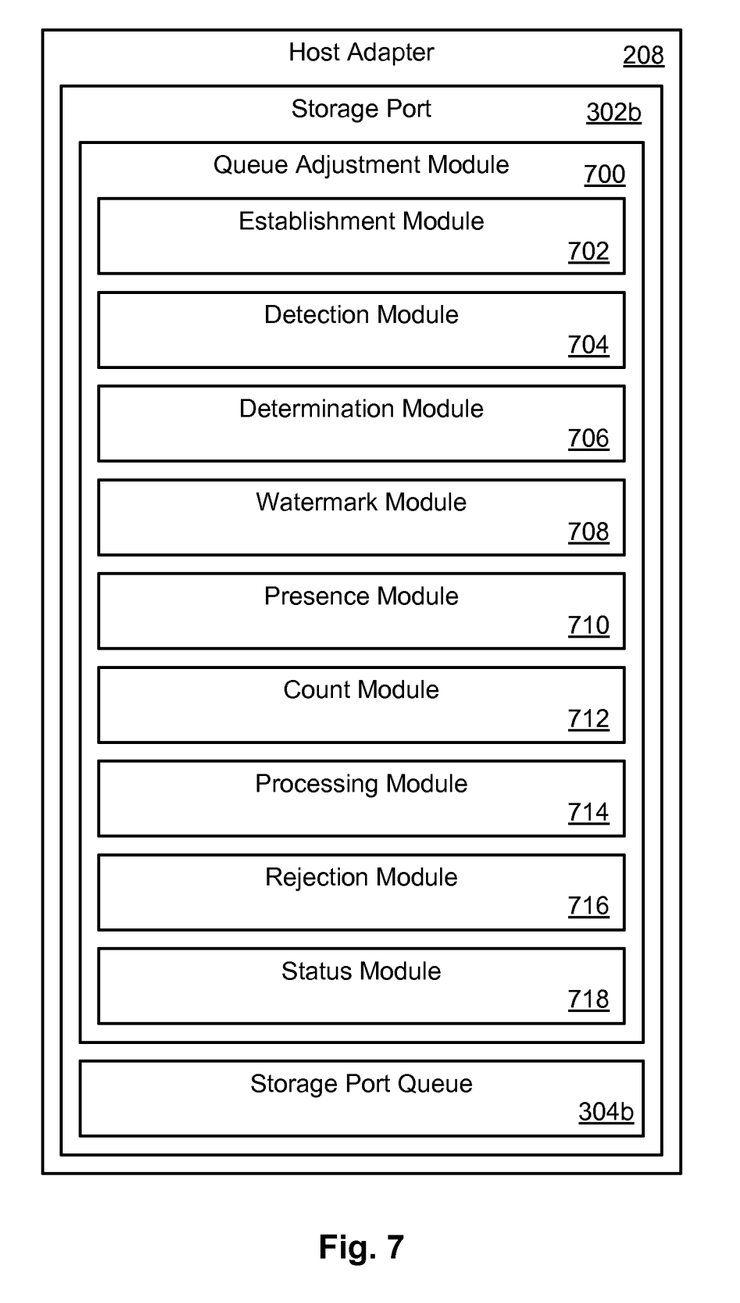
FIG. 7 is a high-level block diagram showing various modules may be used to implement an apparatus and method in accordance with the invention.

Referring to FIG. 7, the methods described in association with FIGS. 4 and 6 may be implemented in the form of one or more modules. These modules may be implemented in hardware, software or firmware executable on hardware, or a combination thereof. These modules are presented only by way of example and are not intended to be limiting. Indeed, alternative embodiments may include more or fewer modules than those illustrated. It should also be recognized that, in some embodiments, the functionality of some modules may be broken into multiple modules or, conversely, the functionality of several modules may be combined into a single module or fewer modules. It should also be recognized that the modules are not necessarily implemented in the locations where they are illustrated. For example, some functionality shown in the host adapter 208 may actually be implemented in other parts of the storage controller 200. Likewise, some functionality shown only in the host adapter 208 may actually be distributed across the host adapter 208 and other parts of the storage controller 200. Thus, the location of the modules is presented only by way of example and is not intended to be limiting.

As shown in FIG. 7, in selected embodiments, each storage port 302b in the host adapter 208 may include one or more of an establishment module 702, a detection module 704, a determination module 706, a watermark module 708, a presence module 710, a count module 712, a processing module 714, a rejection module 716, and a status module 718, among other modules. The storage port 302b may also include a storage port queue 304b as has been previously discussed.

An establishment module 702 may be used to establish one or more watermarks in the storage port queue 304b. The number and location of these watermarks 310 may be hard-coded into the host adapter 208 or set in response to user input. A detection module 704 may detect when a valid command is received by the storage port 302b. Upon receiving a valid command, a determination module 706 may determine the ITL nexus associated with the command. Similarly, a watermark module 708 may determine whether the used space in the storage port queue 304b has reached one or more of the watermarks 310 established by the establishment module 702. If the used space has reached a watermark 310 (with the exception of the high watermark 310b), a presence module 710 may determine whether a specified number of commands having the same ITL nexus as the received command are already in the storage port queue 304b. A count module 712 may, if necessary, count the number of commands for the ITL nexus that are already in the storage port queue 304b.

Depending on which watermark 310 has been reached and how many commands for the ITL nexus are already in the queue 304b, the queue adjustment module 700 may either process or reject the command. A processing module 714 may be provided to process the command (i.e., add the command to the queue 304b for eventual processing), if required. A status module 718 may then return status to the host system 106 indicating that the command was successfully processed. Similarly, a rejection module 716 may be provided to reject the command, if required. If rejected, the status module 718 may return status to the host system 106 indicating that the command was not processed because the queue 304b was full or that the storage port 302b was busy, depending on the situation.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for managing storage space in a storage port queue, the method comprising:
    establishing low, intermediate, and high watermarks for a storage port queue associated with a storage port;
    receiving, at the storage port, a command having an initiator-target-LUN (ITL) nexus associated therewith;
    processing the command in the event used space in the storage port queue has not reached the low watermark;
    in the event the used space has reached the low watermark but not the intermediate watermark, rejecting the command if a first number of commands for the ITL nexus is already present in the storage port queue, and processing the command if the first number of commands for the ITL nexus is not already present in the storage port queue;
    in the event the used space has reached the intermediate watermark but not the high watermark rejecting the command if a second number of commands for the ITL nexus is already present in the storage port queue, and processing the command if the second number of commands for the ITL nexus is not already present in the storage port queue, wherein the second number is smaller than the first number; and
    rejecting the command in the event the used space has reached the high watermark.

2. The method of claim 1, wherein, in the event the used space has reached the low watermark but not the intermediate watermark, rejecting the command further comprises returning QFULL status to a host port that initiated the command.

3. The method of claim 1, wherein, in the event the used space has reached the intermediate watermark but not the high watermark, rejecting the command further comprises returning QFULL status to a host port that initiated the command.

4. The method of claim 1, wherein, in the event the used space has reached the high watermark and at least one command for the ITL nexus is already present in the storage port queue, rejecting the command further comprises returning QFULL status to a host port that initiated the command.

5. The method of claim 1, wherein, in the event the used space has reached the high watermark and at least one command for the ITL nexus is not already present in the storage port queue, rejecting the command further comprises returning BUSY status to a host port that initiated the command.

* * * * *